(12) United States Patent
Kitamoto et al.

(10) Patent No.: US 11,642,658 B2
(45) Date of Patent: May 9, 2023

(54) PGM NANOPARTICLES TWC CATALYSTS FOR GASOLINE EXHAUST GAS APPLICATIONS

(71) Applicant: JOHNSON MATTHEY PUBLIC LIMITED COMPANY, London (GB)

(72) Inventors: Kyoji Kitamoto, Tochigi (JP); Shuhei Nagaoka, Tochigi (JP); Daisuke Yokota, Tochigi (JP)

(73) Assignee: Johnson Matthey Public Limited Company, London (GB)

(*) Notice: Subject to any disclaimer, the term of this patent is extended or adjusted under 35 U.S.C. 154(b) by 140 days.

(21) Appl. No.: 16/523,057

(22) Filed: Jul. 26, 2019

(65) Prior Publication Data
US 2020/0030775 A1 Jan. 30, 2020

Related U.S. Application Data

(60) Provisional application No. 62/711,066, filed on Jul. 27, 2018.

(51) Int. Cl.
*B01J 21/04* (2006.01)
*B01J 21/06* (2006.01)
(Continued)

(52) U.S. Cl.
CPC ............ *B01J 23/44* (2013.01); *B01J 23/464* (2013.01); *B01J 35/023* (2013.01); *B01J 35/026* (2013.01);
(Continued)

(58) Field of Classification Search
CPC . B01J 21/04; B01J 21/06; B01J 21/066; B01J 21/08; B01J 21/10; B01J 21/12;
(Continued)

(56) References Cited

U.S. PATENT DOCUMENTS 6,686,308 B2 * 2/2004 Mao ..................... B01J 23/42
502/185
10,183,276 B2 * 1/2019 Karpov ................ B01J 37/0213
(Continued)

FOREIGN PATENT DOCUMENTS

CA 1242686 A 10/1988
CN 103212413 B 7/2015
(Continued)

OTHER PUBLICATIONS

Masahide Miura et al.; "Development of Advanced Three-Way Catalyst with Improved NOx Conversion", SAE Technical Paper 2015-01-1005, Apr. 14, 2015.
(Continued)

*Primary Examiner* — Cam N. Nguyen
(74) *Attorney, Agent, or Firm* — Ni Yan

(57) ABSTRACT

A three-way catalyst article, and its use in an exhaust system for internal combustion engines, is disclosed. The catalyst article for treating exhaust gas comprising: a substrate; and a first catalytic region on the substrate; wherein the first catalytic region comprises a first platinum group metal (PGM) component, wherein the first PGM component comprises PGM nanoparticles, wherein the PGM nanoparticles have an average particle size of about 1 to about 20 nm with a standard deviation (SD) no more than 1 nm.

18 Claims, 1 Drawing Sheet

(51) Int. Cl.

| | | |
|---|---|---|
| *B01J 21/08* | (2006.01) | |
| *B01J 21/10* | (2006.01) | |
| *B01J 21/12* | (2006.01) | |
| *B01J 21/14* | (2006.01) | |
| *B01J 23/10* | (2006.01) | |
| *B01J 23/40* | (2006.01) | |
| *B01J 23/42* | (2006.01) | |
| *B01J 23/44* | (2006.01) | |
| *B01J 23/46* | (2006.01) | |
| *B01J 35/02* | (2006.01) | |
| *F01N 3/10* | (2006.01) | |
| *F01N 3/28* | (2006.01) | |
| *B82Y 30/00* | (2011.01) | |
| *B01J 23/00* | (2006.01) | |
| *B82Y 40/00* | (2011.01) | |

(52) U.S. Cl.
CPC ........... *F01N 3/101* (2013.01); *F01N 3/2803* (2013.01); *B01J 21/04* (2013.01); *B01J 23/002* (2013.01); *B82Y 30/00* (2013.01); *B82Y 40/00* (2013.01); *F01N 2370/02* (2013.01)

(58) Field of Classification Search
CPC . B01J 21/14; B01J 23/002; B01J 23/10; B01J 23/40; B01J 23/42; B01J 23/44; B01J 23/46; B01J 23/464; B01J 35/023; B01J 35/026; F01N 3/101; F01N 3/2803; B82Y 30/00

See application file for complete search history.

(56) References Cited

U.S. PATENT DOCUMENTS

| | | | |
|---|---|---|---|
| 2014/0205523 A1 | 7/2014 | Arnold et al. | |
| 2019/0240643 A1* | 8/2019 | Karpov | B01J 35/023 |
| 2019/0388838 A1* | 12/2019 | Luo | B01J 37/0201 |

FOREIGN PATENT DOCUMENTS

| | | |
|---|---|---|
| EP | 0304095 A3 | 5/1990 |
| RU | 2395341 C1 | 7/2010 |
| RU | 2593293 C2 | 8/2016 |
| WO | 2016094399 A1 | 6/2016 |

OTHER PUBLICATIONS

J. A. Lupescu—Pd Model Catalysts: Effects of Aging Environment, Aging Duration and Interrupting Aging with Brief Air Pulses on Lean Pd Redispersion. A dissertation submitted in partial fulfillment of the requirements for the degree of Doctor of Philosophy (Chemical Engineering) at the University of Michigan 2016, 197 pages.

* cited by examiner

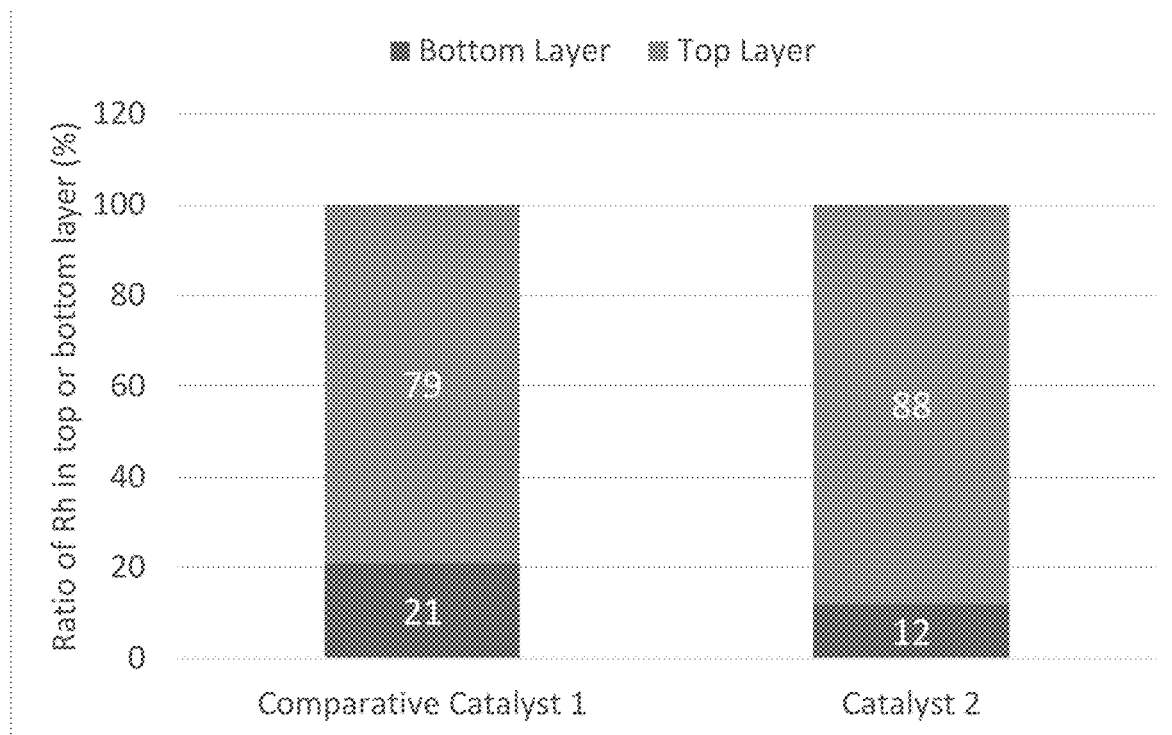

PGM NANOPARTICLES TWC CATALYSTS FOR GASOLINE EXHAUST GAS APPLICATIONS

FIELD OF THE INVENTION

The present invention relates to a catalyzed article useful in treating exhaust gas emissions from gasoline engines.

BACKGROUND OF THE INVENTION

Internal combustion engines produce exhaust gases containing a variety of pollutants, including hydrocarbons (HCs), carbon monoxide (CO), and nitrogen oxides ("$NO_x$"). Emission control systems, including exhaust gas catalysts, are widely utilized to reduce the amount of these pollutants emitted to atmosphere. A commonly used catalyst for gasoline engine applications is the TWC. TWCs perform three main functions: (1) oxidation of CO; (2) oxidation of unburnt HCs; and (3) reduction of $NO_x$ to $N_2$.

In most catalytic converters, platinum group metals (PGMs) (e.g., Pt, Pd, and Rh) have been widely used as active site of catalytic conversion with other inorganic compounds e.g. alumina and ceria-zirconia mixed oxide for the support carriers. PGM formed as nanoparticle is a leading part of catalytic reactions and keeping higher dispersion of the PGM nanoparticle under aging condition (especially under harsh aging conditions) has been a major issue for the improvement of TWC performance. Use of size-controlled nanoparticles rather than wide-distributed particles in size, which are usually produced by impregnation of PGM salts, is one of approaches to improve the thermal stability of the PGM nanoparticles (for example, see Miura et al., SAE Technical Paper 2015-01-1005). The effective size of the nanoparticle should be highly depending on the condition of applications, e.g., thermal stress during aging, concentration of PGM in the washcoat, and so on.

On the other hand, for the future-expected gasoline engine strategy focused on motor-assisted hybrid or turbo-charger system which will be providing lower-temperature exhaust gasses, effective-size-tuned technology of PGM nanoparticle to fit this application condition would be major challenge of the TWC development. This invention solves these needs to reduce the emission of the pollutants under condition of lower-temperature TWC applications by using effective-size selected nanoparticle of PGM.

SUMMARY OF THE INVENTION

One aspect of the present disclosure is directed to a TWC catalyst composition comprising platinum group metal (PGM) nanoparticles, wherein the PGM nanoparticles have an average particle size of about 1 nm to about 20 nm with a standard deviation (SD) no more than 1 nm.

Another aspect of the present disclosure is directed to a catalyst article for treating exhaust gas comprising: a substrate; and a first catalytic region on the substrate; wherein the first catalytic region comprises a first platinum group metal (PGM) component, wherein the first PGM component comprises PGM nanoparticles, wherein the PGM nanoparticles have an average particle size of about 1 to about 20 nm with a standard deviation (SD) no more than 1 nm.

The invention also encompasses an exhaust system for internal combustion engines that comprises the three-way catalyst component of the invention.

The invention also encompasses treating an exhaust gas from an internal combustion engine, in particular for treating exhaust gas from a gasoline engine. The method comprises contacting the exhaust gas with the three-way catalyst component of the invention.

BRIEF DESCRIPTION OF THE DRAWINGS

FIG. 1 shows Rh ratio in top layer and bottom layer in a two-layer TWC catalyst after engine bench aging.

DETAILED DESCRIPTION OF THE INVENTION

The present invention is directed to the catalytic treatment of combustion exhaust gas, such as that produced by gasoline engines or other engines, and to related catalytic articles and systems. More specifically, the invention relates the simultaneous treatment of $NO_x$, CO, and HC in a vehicular exhaust system. The inventors have discovered an effective average size and the distribution of PGM for TWC applications to reduce the emission of $NO_x$, CO, and HC through effective suppression of sintering of PGM during aging. The processes of the present invention can potentially reduce the PGM amount and lower costs of the catalyst.

One aspect of the present disclosure is directed to a TWC catalyst composition comprising platinum group metal (PGM) nanoparticles, wherein the PGM nanoparticles have an average particle size of about 1 nm to about 20 nm with a standard deviation (SD) no more than 1 nm.

The PGM nanoparticles of the TWC catalyst composition can be Pd, Rh, or Pt. In some embodiments, the PGM nanoparticles are Rh or Pd. In further embodiments, the PGM nanoparticles are Rh.

The PGM nanoparticles of the TWC catalyst composition can have an average particle size of about 2 to about 15 nm, or about 3 to about 10 nm.

Alternatively, the PGM nanoparticles of the TWC catalyst composition can have an average particle size of no more than about 15 nm, or no more than about 10 nm.

The TWC catalyst composition can comprise up to 20 wt. % of the PGM nanoparticles. Preferably, the TWC catalyst composition can comprise 0.05-10 wt. %, more preferably, 0.2-5 wt. % of the PGM nanoparticles.

The TWC catalyst composition can further comprise another PGM component.

The TWC catalyst composition can further comprise an inorganic oxide, an oxygen storage capacity (OSC) material, and/or an alkali or alkali earth metal component.

The inorganic oxide is preferably an oxide of Groups 2, 3, 4, 5, 13 and 14 elements. The inorganic oxide is preferably selected from the group consisting of alumina, magnesia, lanthana, silica, neodymium, praseodymium, yttrium oxides, titania, niobia, tantalum oxides, molybdenum oxides, tungsten oxides, and mixed oxides or composite oxides thereof. More preferably, the inorganic oxide is selected from the group consisting of alumina, magnesia, silica, lanthanum, neodymium, praseodymium, yttrium oxides, and mixed oxides or composite oxides thereof. Particularly preferably, the inorganic oxide is alumina, a lanthanum/alumina composite oxide, or a magnesia/alumina composite oxide. One especially preferred inorganic oxide is a lanthanum/alumina composite oxide. The inorganic oxide may be a support material for the PGM nanoparticles, and/or for the alkali or alkali earth metal.

The inorganic oxides preferably have a fresh surface area of greater than 80 $m^2/g$, pore volumes in the range 0.1 to 4 mL/g. High surface area inorganic oxides having a surface area greater than 100 $m^2/g$ are particularly preferred, e.g.

high surface area alumina. Other preferred inorganic oxides include lanthanum/alumina composite oxides, optionally further comprising a cerium-containing component, e.g. ceria. In such cases the ceria may be present on the surface of the lanthanum/alumina composite oxide, e.g. as a coating.

The OSC material is preferably selected from the group consisting of cerium oxide, zirconium oxide, a ceria-zirconia mixed oxide, and an alumina-ceria-zirconia mixed oxide. More preferably, the OSC material comprises the ceria-zirconia mixed oxide. The ceria-zirconia mixed oxide can further comprise some dopants, such as, La, Nd, Y, Pr, etc.

The ceria-zirconia mixed oxide can have a molar ratio of zirconia to ceria at least 50:50, preferably, higher than 60:40, more preferably, higher than 75:25. In addition, the OSC material may function as a support material for the PGM nanoparticles. In some embodiments, the PGM nanoparticles are supported on the OSC material and the inorganic oxide The OSC material (e.g., ceria-zirconia mixed oxide) can be from 10 to 90 wt %, preferably, 25-75 wt %, more preferably, 35-65 wt %, based on the total weight of the TWC catalyst composition.

The OSC material and the inorganic oxide can have a weight ratio of no greater than 10:1, preferably, no greater than 8:1 or 5:1, more preferably, no greater than 4:1 or 3:1, most preferably, no greater than 2:1.

Alternatively, the OSC material and the inorganic oxide can have a weight ratio of 10:1 to 1:10, preferably, 8:1 to 1:8 or 5:1 to 1:5; more preferably, 4:1 to 1:4 or 3:1 to 1:3; and most preferably, 2:1 to 1:2.

In some embodiments, the alkali or alkali earth metal may be deposited on the OSC material. Alternatively, or in addition, the alkali or alkali earth metal may be deposited on the inorganic oxide. That is, in some embodiments, the alkali or alkali earth metal may be deposited on, i.e. present on, both the OSC material and the inorganic oxide.

Preferably the alkali or alkali earth metal is supported/deposited on the inorganic oxide (e.g., alumina). In addition to, or alternatively to, being in contact with the inorganic oxide, the alkali or alkali earth metal may be in contact with the OSC material and also the PGM nanoparticles.

The alkali or alkali earth metal is preferably barium or strontium. Preferably the barium or strontium, where present, is present in an amount of 0.1 to 15 weight percent, and more preferably 3 to 10 weight percent, based on the total weight of the TWC catalyst composition.

Preferably the barium is present as a $BaCO_3$ composite material. Such a material can be preformed by any method known in the art, for example incipient wetness impregnation or spray-drying.

As demonstrated in Example 1, the PGM nanoparticles (e.g., Rh) can have an average particle size of less than 40 nm after aging at 950° C. for 20 hours. The PGM nanoparticles can have an average particle size of no more than 35, 30, 25, or 20 nm after aging at 950° C. for 20 hours. The sintering is effectively suppressed for Rh nanoparticles which is originally stable compound as compared to conventional impregnated Rh compounds. The reduced size of Rh after aging means increased number of the active site, and then the TWC performance is improved through promoted catalytic conversion of CO, HC, and $NO_x$.

Another aspect of the present disclosure is directed to a catalyst article for treating exhaust gas comprising: a substrate; and a first catalytic region on the substrate; wherein the first catalytic region comprises a first platinum group metal (PGM) component, wherein the first PGM component comprises PGM nanoparticles, wherein the PGM nanoparticles have an average particle size of about 1 to about 20 nm with a standard deviation (SD) no more than 1 nm.

The PGM nanoparticles can be Pd, Rh, or Pt. In some embodiments, the PGM nanoparticles are Rh or Pd. In further embodiments, the PGM nanoparticles are Rh.

The PGM nanoparticles can have an average particle size of about 2 to about 15 nm, or about 3 to about 10 nm.

Alternatively, the PGM nanoparticles can have an average particle size of no more than about 15 nm, or no more than about 10 nm.

The first catalytic region can comprise up to 350 $g/ft^3$ of the PGM nanoparticles. Preferably, the first catalytic region can comprise 10-300 $g/ft^3$, more preferably, 25-150 $g/ft^3$ of the PGM nanoparticles.

The first catalytic region can further comprise a first inorganic oxide, a first oxygen storage capacity (OSC) material, and/or a first alkali or alkali earth metal component.

The total washcoat loading of the first catalytic region can be from 0.1 to 5 $g/in^3$. Preferably, the total washcoat loading of the first catalytic region is 0.5 to 3.5 $g/in^3$, most preferably, the total washcoat loading of the first catalytic region is 1 to 2.5 $g/in^3$.

The first inorganic oxide is preferably an oxide of Groups 2, 3, 4, 5, 13 and 14 elements. The first inorganic oxide is preferably selected from the group consisting of alumina, magnesia, lanthana, silica, neodymium, praseodymium, yttrium oxides, titania, niobia, tantalum oxides, molybdenum oxides, tungsten oxides, and mixed oxides or composite oxides thereof. More preferably, the first inorganic oxide is selected from the group consisting of alumina, magnesia, silica, lanthanum, neodymium, praseodymium, yttrium oxides, and mixed oxides or composite oxides thereof. Particularly preferably, the first inorganic oxide is alumina, a lanthanum/alumina composite oxide, or a magnesia/alumina composite oxide. One especially preferred first inorganic oxide is a lanthanum/alumina composite oxide. The first inorganic oxide may be a support material for the PGM nanoparticles, and/or for the first alkali or alkali earth metal.

The first inorganic oxides preferably have a fresh surface area of greater than 80 $m^2/g$, pore volumes in the range 0.1 to 4 mL/g. High surface area inorganic oxides having a surface area greater than 100 $m^2/g$ are particularly preferred, e.g. high surface area alumina. Other preferred first inorganic oxides include lanthanum/alumina composite oxides, optionally further comprising a cerium-containing component, e.g., ceria. In such cases the ceria may be present on the surface of the lanthanum/alumina composite oxide, e.g., as a coating.

The first OSC material is preferably selected from the group consisting of cerium oxide, zirconium oxide, a ceria-zirconia mixed oxide, and an alumina-ceria-zirconia mixed oxide. More preferably, the first OSC material comprises the ceria-zirconia mixed oxide. The ceria-zirconia mixed oxide can further comprise some dopants, such as, La, Nd, Y, Pr, etc.

The ceria-zirconia mixed oxide can have a molar ratio of zirconia to ceria at least 50:50, preferably, higher than 60:40, more preferably, higher than 75:25. In addition, the first OSC material may function as a support material for the PGM nanoparticles. In some embodiments, the PGM nanoparticles are supported on the first OSC material and the first inorganic oxide The first OSC material (e.g., ceria-zirconia mixed oxide) can be from 10 to 90 wt %, preferably, 25-75 wt %, more preferably, 35-65 wt %, based on the total washcoat loading of the first catalytic region.

The first OSC material loading in the first catalytic region can be less than 1.5 g/in$^3$. In some embodiments, the first OSC material loading in the first catalytic region is no greater than 1.2 g/in$^3$, 1.0 g/in$^3$, 0.9 g/in$^3$, 0.8 g/in$^3$, 0.7 g/in$^3$, or 0.6 g/in$^3$.

The first OSC material and the first inorganic oxide can have a weight ratio of no greater than 10:1, preferably, no greater than 8:1 or 5:1, more preferably, no greater than 4:1 or 3:1, most preferably, no greater than 2:1.

Alternatively, the first OSC material and the first inorganic oxide can have a weight ratio of 10:1 to 1:10, preferably, 8:1 to 1:8 or 5:1 to 1:5; more preferably, 4:1 to 1:4 or 3:1 to 1:3; and most preferably, 2:1 to 1:2.

In some embodiments, the first alkali or alkali earth metal may be deposited on the first OSC material. Alternatively, or in addition, the first alkali or alkali earth metal may be deposited on the first inorganic oxide. That is, in some embodiments, the first alkali or alkali earth metal may be deposited on, i.e. present on, both the first OSC material and the first inorganic oxide.

Preferably the first alkali or alkali earth metal is supported/deposited on the first inorganic oxide (e.g., alumina). In addition to, or alternatively to, being in contact with the first inorganic oxide, the first alkali or alkali earth metal may be in contact with the first OSC material and also the PGM nanoparticles.

The first alkali or alkali earth metal is preferably barium or strontium. Preferably the barium or strontium, where present, is present in an amount of 0.1 to 15 weight percent, and more preferably 3 to 10 weight percent, based on the total washcoat loading of the first catalytic region.

Preferably the barium is present as a $BaCO_3$ composite material. Such a material can be performed by any method known in the art, for example incipient wetness impregnation or spray-drying.

The first PGM component can further comprise another PGM. The another PGM can be selected from the group consisting of platinum, palladium, rhodium, and a mixture thereof.

In other embodiments, the first catalytic region can be substantially free of PGMs other than the PGM nanoparticles. In further embodiments, the first catalytic region can be essentially free of PGMs other than the PGM nanoparticles.

The catalyst article can further comprise a second catalytic region.

The second catalytic region can comprise a second PGM component, a second oxygen storage capacity (OSC) material, a second alkali or alkali earth metal component, and/or a second inorganic oxide.

The second PGM component can be selected from the group consisting of palladium, platinum, rhodium, and a mixture thereof. In some embodiments, the second PGM component can be Pd, when the PGM nanoparticles are Rh. The second PGM component can be Rh, when the PGM nanoparticles are Pd.

The second catalytic region can comprise up to 350 g/ft$^3$ of the second PGM component. Preferably, the second catalytic region can comprise 10-300 g/ft$^3$, more preferably, 25-150 g/ft$^3$ of the second PGM component.

The total washcoat loading of the second catalytic region can be from 0.1 to 5 g/in$^3$. Preferably, the total washcoat loading of the second catalytic region is 0.5 to 3.5 g/in$^3$, most preferably, the total washcoat loading of the second catalytic region is 1 to 2.5 g/in$^3$.

The second inorganic oxide is preferably an oxide of Groups 2, 3, 4, 5, 13 and 14 elements. The second inorganic oxide is preferably selected from the group consisting of alumina, magnesia, lanthana, silica, neodymium, praseodymium, yttrium oxides, titania, niobia, tantalum oxides, molybdenum oxides, tungsten oxides, and mixed oxides or composite oxides thereof. More preferably, the second inorganic oxide is selected from the group consisting of alumina, magnesia, silica, lanthanum, neodymium, praseodymium, yttrium oxides, and mixed oxides or composite oxides thereof. Particularly preferably, the second inorganic oxide is alumina, a lanthanum/alumina composite oxide, or a magnesia/alumina composite oxide. One especially preferred second inorganic oxide is a lanthanum/alumina composite oxide. The second inorganic oxide may be a support material for the second PGM component, and/or for the second alkali or alkali earth metal.

The second inorganic oxides preferably have a fresh surface area of greater than 80 m$^2$/g, pore volumes in the range 0.1 to 4 mL/g. High surface area inorganic oxides having a surface area greater than 100 m$^2$/g are particularly preferred, e.g. high surface area alumina. Other preferred second inorganic oxides include lanthanum/alumina composite oxides, optionally further comprising a cerium-containing component, e.g. ceria. In such cases the ceria may be present on the surface of the lanthanum/alumina composite oxide, e.g., as a coating.

The second OSC material is preferably selected from the group consisting of cerium oxide, zirconium oxide, a ceria-zirconia mixed oxide, and an alumina-ceria-zirconia mixed oxide. More preferably, the second OSC material comprises the ceria-zirconia mixed oxide. The ceria-zirconia mixed oxide can further comprise some dopants, such as, La, Nd, Y, Pr, etc.

The ceria-zirconia mixed oxide can have a molar ratio of zirconia to ceria at least 50:50, preferably, higher than 60:40, more preferably, higher than 75:25. In addition, the second OSC material may function as a support material for the second PGM component. In some embodiments, the second PGM component are supported on the second OSC material and the second inorganic oxide The second OSC material (e.g., ceria-zirconia mixed oxide) can be from 10 to 90 wt %, preferably, 25-75 wt %, more preferably, 35-65 wt %, based on the total washcoat loading of the second catalytic region.

The second OSC material loading in the second catalytic region can be less than 1.5 g/in$^3$. In some embodiments, the second OSC material loading in the second catalytic region is no greater than 1.2 g/in$^3$, 1.0 g/in$^3$, 0.9 g/in$^3$, 0.8 g/in$^3$, 0.7 g/in$^3$, or 0.6 g/in$^3$.

The second OSC material and the second inorganic oxide can have a weight ratio of no greater than 10:1, preferably, no greater than 8:1 or 5:1, more preferably, no greater than 4:1 or 3:1, most preferably, no greater than 2:1.

Alternatively, the second OSC material and the second inorganic oxide can have a weight ratio of 10:1 to 1:10, preferably, 8:1 to 1:8 or 5:1 to 1:5; more preferably, 4:1 to 1:4 or 3:1 to 1:3; and most preferably, 2:1 to 1:2.

In some embodiments, the second alkali or alkali earth metal may be deposited on the second OSC material. Alternatively, or in addition, the second alkali or alkali earth metal may be deposited on the second inorganic oxide. That is, in some embodiments, the second alkali or alkali earth metal may be deposited on, i.e. present on, both the second OSC material and the second inorganic oxide.

Preferably the second alkali or alkali earth metal is supported/deposited on the second inorganic oxide (e.g., alumina). In addition to, or alternatively to, being in contact with the second inorganic oxide, the second alkali or alkali earth metal may be in contact with the second OSC material and also the second PGM component.

The second alkali or alkali earth metal is preferably barium or strontium. Preferably the barium or strontium, where present, is present in an amount of 0.1 to 15 weight percent, and more preferably 3 to 10 weight percent, based on the total washcoat loading of the second catalytic region.

Preferably the barium is present as a $BaCO_3$ composite material. Such a material can be performed by any method known in the art, for example incipient wetness impregnation or spray-drying.

In some embodiments, the first PGM component and the second PGM component has a weight ratio of from 60:1 to 1:60. Preferably, the first PGM component and the second PGM component has a weight ratio of from 30:1 to 1:30. More preferably, the first PGM component and the second PGM component has a weight ratio of from 20:1 to 1:20. Most preferably, the first PGM component and the second PGM component has a weight ratio of from 15:1 to 1:15.

The catalyst article of the invention may comprise further components that are known to the skilled person. For example, the compositions of the invention may further comprise at least one binder and/or at least one surfactant. Where a binder is present, dispersible alumina binders are preferred.

Preferably the substrate is a flow-through monolith, or wall flow gasoline particulate filter. More preferably, the substrate is a flow-through monolith.

The flow-through monolith substrate has a first face and a second face defining a longitudinal direction there between. The flow-through monolith substrate has a plurality of channels extending between the first face and the second face. The plurality of channels extend in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 100 to 900 channels per square inch, preferably from 300 to 750. For example, on the first face, the density of open first channels and closed second channels is from 300 to 750 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates is well known in the art.

It should be noted that the flow-through monolith substrate described herein is a single component (i.e. a single brick). Nonetheless, when forming an emission treatment system, the monolith used may be formed by adhering together a plurality of channels or by adhering together a plurality of smaller monoliths as described herein. Such techniques are well known in the art, as well as suitable casings and configurations of the emission treatment system.

In embodiments wherein the catalyst article of the present comprises a ceramic substrate, the ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In embodiments wherein the catalyst article of the present invention comprises a metallic substrate, the metallic substrate may be made of any suitable metal, and in particular heat-resistant metals and metal alloys such as titanium and stainless steel as well as ferritic alloys containing iron, nickel, chromium, and/or aluminum in addition to other trace metals.

In some embodiments, the first catalytic region is supported/deposited directly on the substrate. In further embodiments, the second catalytic region is supported/deposited on the first catalytic region.

In other embodiments, the second catalytic region is supported/deposited directly on the substrate. In further embodiments, the first catalytic region is supported/deposited on the second catalytic region.

As demonstrated in Example 1, the PGM nanoparticles (e.g., Rh) can have an average particle size of less than 40 nm after aging at 950° C. for 20 hours. The PGM nanoparticles can have an average particle size of no more than 35, 30, 25, or 20 nm after aging at 950° C. for 20 hours.

Also, to our surprise, inventors have found out that there was less Rh migration even after the catalyst article being aged at 950° C. for 20 hours when compared with conventional TWC catalyst. Typically, in a double layer setting, Rh will likely to migrate from one layer to another layer after aging at 950° C. (as shown in FIG. 1, Comparative Catalyst 1). However, as shown in FIG. 1, Catalyst 2 of the present application showed less than 15% Rh migration after aging at 950° C. for 20 hours. The migration of Rh to another layer induces non-preferable interaction with other PGM (e.g., Pd) or support materials (e.g., $CeO_2$) to deactivate original Rh performance. Thus, the less migration of Rh using the nanoparticle also provides benefit to keep the higher performance of TWC.

In embodiments wherein the catalyst article comprises the first catalytic region and the second catalytic region, less than 18% of the PGM nanoparticles can be present in the second catalytic region after aging at 950° C. for 20 hours. In some embodiments, no more than 16%, 15%, or 14% of the PGM nanoparticles can be present in the second catalytic region after aging at 950° C. for 20 hours.

Another aspect of the present disclosure is directed to a method for treating a vehicular exhaust gas containing $NO_x$, CO, and HC using the catalyst article described herein. Catalytic converters equipped with TWC made according to the invention show improved or comparable catalytic performance compared to conventional TWC (e.g., see Example 3 and Table 4).

Another aspect of the present disclosure is directed to a system for treating vehicular exhaust gas comprising the catalyst article described herein in conjunction with a conduit for transferring the exhaust gas through the system.

DEFINITIONS

The term "washcoat" is well known in the art and refers to an adherent coating that is applied to a substrate usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise."

The expression "essentially free of" as used herein with reference to a material, typically in the context of the content of a region, a layer or a zone, means that the material in a trace amount, such as ≤1% by weight, preferably ≤0.5% by weight, more preferably ≤0.1% by weight. The expression "essentially free of" embraces the expression "does not comprise."

Any reference to an amount of dopant, particularly a total amount, expressed as a % by weight as used herein refers to the weight of the support material or the refractory metal oxide thereof.

The term "loading" as used herein refers to a measurement in units of $g/ft^3$ on a metal weight basis.

The following examples merely illustrate the invention. Those skilled in the art will recognize many variations that are within the spirit of the invention and scope of the claims.

EXAMPLES

Materials

All materials are commercially available and were obtained from known suppliers, unless noted otherwise.

Catalyst 1 (Comparative)

Catalyst 1 is a three-way (Pd—Rh) catalyst with a double-layered structure. The bottom layer consists of Pd supported on a washcoat of a first CeZr mixed oxide, La-stabilized alumina with 4 wt %, Ba promotor. The washcoat loading of the bottom layer was about 1.6 $g/in^3$ with a Pd loading of 140 $g/ft^3$. The top layer consists of Rh supported on a washcoat of a second CeZr mixed oxide, La-stabilized alumina. The washcoat loading of the top layer was about 1.0 $g/in^3$ with a Rh loading of 24 $g/ft^3$. The total washcoat loading of Catalyst 1 was about 2.6 $g/in^3$.

Catalyst 2

Catalyst 2 was prepared according to the present invention. The bottom layer consists of Pd supported on a washcoat of a first CeZr mixed oxide, La-stabilized alumina with 4 wt %, Ba promotor. The washcoat loading of the bottom layer was about 1.6 $g/in^3$ with a Pd loading of 140 $g/ft^3$. The top layer consists of Rh nanoparticle (Colloidal Rh Nano Particle with average particle size of 3.10 nm and SD of 0.92 nm) supported on a washcoat of a second CeZr mixed oxide, La-stabilized alumina. The washcoat loading of the top layer was about 1.0 $g/in^3$ with a Rh loading of 24 $g/ft^3$. The total washcoat loading of Catalyst 2 was about 2.6 $g/in^3$.

Experimental Results

Example 1

Comparative Catalyst 1 and Catalysts 2 were bench aged for 20 hours with fuel cut aging cycles using naturally aspirated gasoline engine of 1.8 L in-line 4, with peak temperature at 950° C. The average particle size of Rh in the catalysts after the bench aging was analyzed by transmission electron microscopy.

TABLE 1

Particle Size of Rh after Bench Aging

| | Rh Particle Size (nm) | |
|---|---|---|
| | Average | Standard Deviation |
| Comparative Catalyst 1 | 51.3 | 11.9 |
| Catalyst 2 | 15.5 | 6.9 |

As shown in Table 1, the Rh particles in Catalyst 2 have significantly smaller and narrower size distribution as compared to the Catalyst 1.

Example 2

The dispersion of Rh used in the catalyst washcoat powders of the top layer of Comparative Catalyst 1 and Catalyst 2 was analyzed by CO-pulse method before/after hydrothermal aging at 1050° C. for 4 hours under the following conditions using the oxidizing atmosphere and reduction atmosphere gases which have the compositions shown in Table 2.

TABLE 2

Gas Composition for Hydrothermal Redox Aging

| | $H_2$ (%) | CO (%) | $O_2$ (%) | $H_2O$ (%) | $N_2$ |
|---|---|---|---|---|---|
| Oxidizing Atmosphere Gas | 0 | 0 | 3 | 10 | Balance |
| Reduction Atmosphere Gas | 3 | 3 | 0 | 10 | Balance |

TABLE 3

Rh dispersion before/after Hydrothermal Redox Aging

| | Rh Dispersion (%) | |
|---|---|---|
| | Before Aging | After Aging |
| Top Layer of Comparative Catalyst 1 | 81.7 | 1.43 |
| Top Layer of Catalyst 2 | 29.4 | 2.37 |

As shown in Table 3, while the Rh dispersion of the top layer washcoat is higher for the Comparative Catalyst 1 than Catalyst 2 before the aging, the dispersion is higher for the Catalyst 2 than Comparative Catalyst 1 after the aging.

Example 3

Comparative Catalyst 1 and Catalysts 2 were bench aged for 20 hours with fuel cut aging cycles using naturally aspirated gasoline engine of 1.8 L in-line 4, with peak temperature at 950° C. vehicle emissions were conducted over a commercial vehicle with 1.5 litre engine. Emissions were measured pre- and post-catalyst.

TABLE 4

Catalysts Performance by Bag Emission Analysis

| | Weighted Tailpipe Emissions (g/km) | | | |
|---|---|---|---|---|
| | HC | NMHC | CO/10 | $NO_x$ |
| Comparative Catalyst 1 | 0.0167 | 0.0091 | 0.0434 | 0.0135 |
| Catalyst 2 | 0.0152 | 0.0081 | 0.0443 | 0.0118 |

As shown in Table 2, Catalyst 2 showed improved performance on emission reduction of HC, NMHC, and $NO_x$ while maintaining comparable performance on CO emission reduction, in compared with Comparative Catalyst 1.

We claim:

1. A TWC catalyst composition comprising platinum group metal (PGM) nanoparticles, wherein the PGM nanoparticles have an average particle size of about 2 nm to about 15 nm with a standard deviation (SD) no more than 1 nm, and wherein the PGM nanoparticles have an average particle size of less than 40 nm after aging at 950° C. for 20 hours.

2. The TWC catalyst composition of claim 1, wherein the PGM nanoparticles are Rh or Pd.

3. The TWC catalyst composition of claim 2, wherein the PGM nanoparticles are Rh.

4. The TWC catalyst composition of claim 1 further comprising an inorganic oxide.

5. The TWC catalyst composition of claim 4, wherein the inorganic oxide is selected from the group consisting of alumina, magnesia, silica, lanthana, neodymium oxide, praseodymium oxide, yttrium oxides, and mixed oxides or composite oxides thereof.

6. The TWC catalyst composition of claim 5, wherein the inorganic oxide is alumina or a lanthana/alumina composite oxide.

7. The TWC catalyst composition of claim 4, wherein the PGM nanoparticles are supported on the inorganic oxide.

8. The TWC catalyst composition of claim 1, further comprising an oxygen storage capacity (OSC) material, and/or an alkali or alkaline-earth metal component.

9. The TWC catalyst composition of claim 8, wherein the OSC material is selected from the group consisting of cerium oxide, zirconium oxide, a ceria-zirconia mixed oxide, and an alumina-ceria-zirconia mixed oxide.

10. The TWC catalyst composition of claim 8, wherein the OSC material comprises the ceria-zirconia mixed oxide.

11. The TWC catalyst composition of claim 8, wherein the PGM nanoparticles are supported on the OSC material.

12. The TWC catalyst composition of claim 11, wherein the PGM nanoparticles are supported on the OSC material and the inorganic oxide.

13. A catalyst article for treating exhaust gas comprising:
a substrate; and
a first catalytic region on the substrate;
wherein the first catalytic region comprises a first platinum group metal (PGM) component, wherein the first PGM component comprises PGM nanoparticles, wherein the PGM nanoparticles have an average particle size of about 2 nm to about 15 nm with a standard deviation (SD) no more than 1 nm, and wherein the PGM nanoparticles have an average particle size of less than 40 nm after aging at 950° C. for 20 hours.

14. The catalyst article of claim 13, wherein the PGM nanoparticles are Rh or Pd.

15. The catalyst article of claim 13, wherein the first catalytic region further comprises a first inorganic oxide.

16. The catalyst article of claim 15, wherein the first inorganic oxide is selected from the group consisting of alumina, magnesia, silica, lanthanum, neodymium, praseodymium, yttrium oxides, and mixed oxides or composite oxides thereof.

17. The catalyst article of claim 16, wherein the first inorganic oxide is alumina or a lanthana/alumina composite oxide.

18. The catalyst article of claim 15, wherein the PGM nanoparticles are supported on the first inorganic oxide.

* * * * *